June 24, 1930.  M. H. DAMERELL  1,766,812
CENTERING MACHINE
Filed June 9, 1926  5 Sheets-Sheet 1
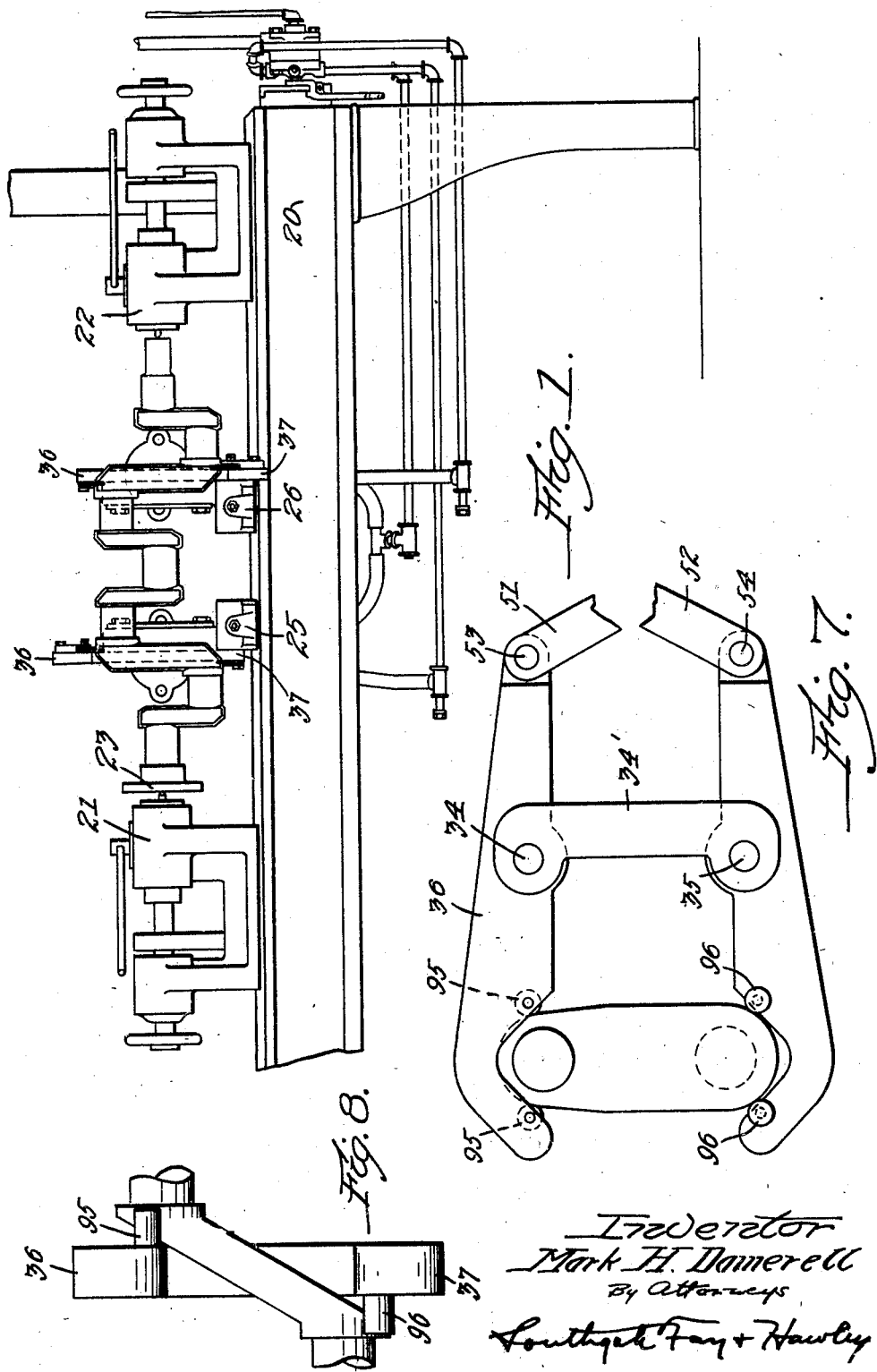

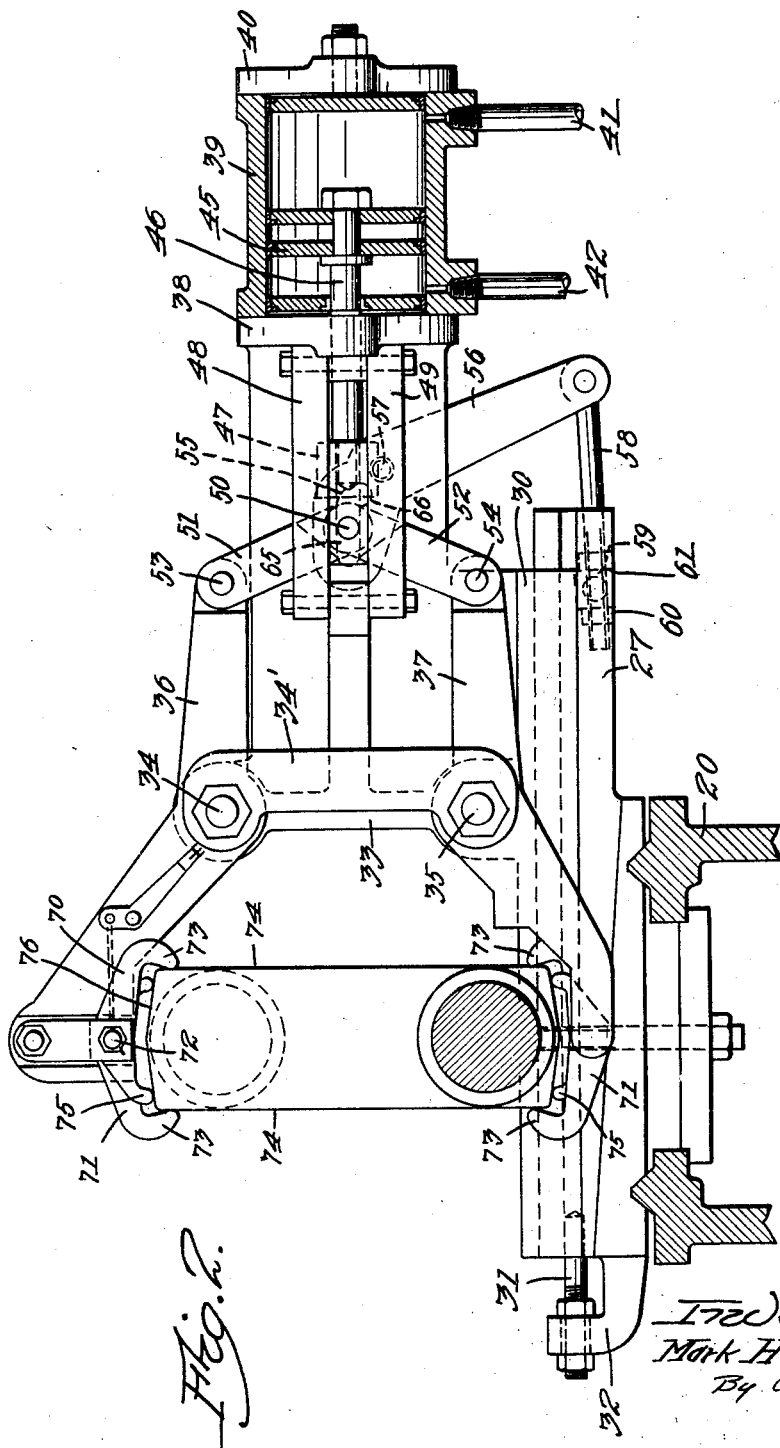

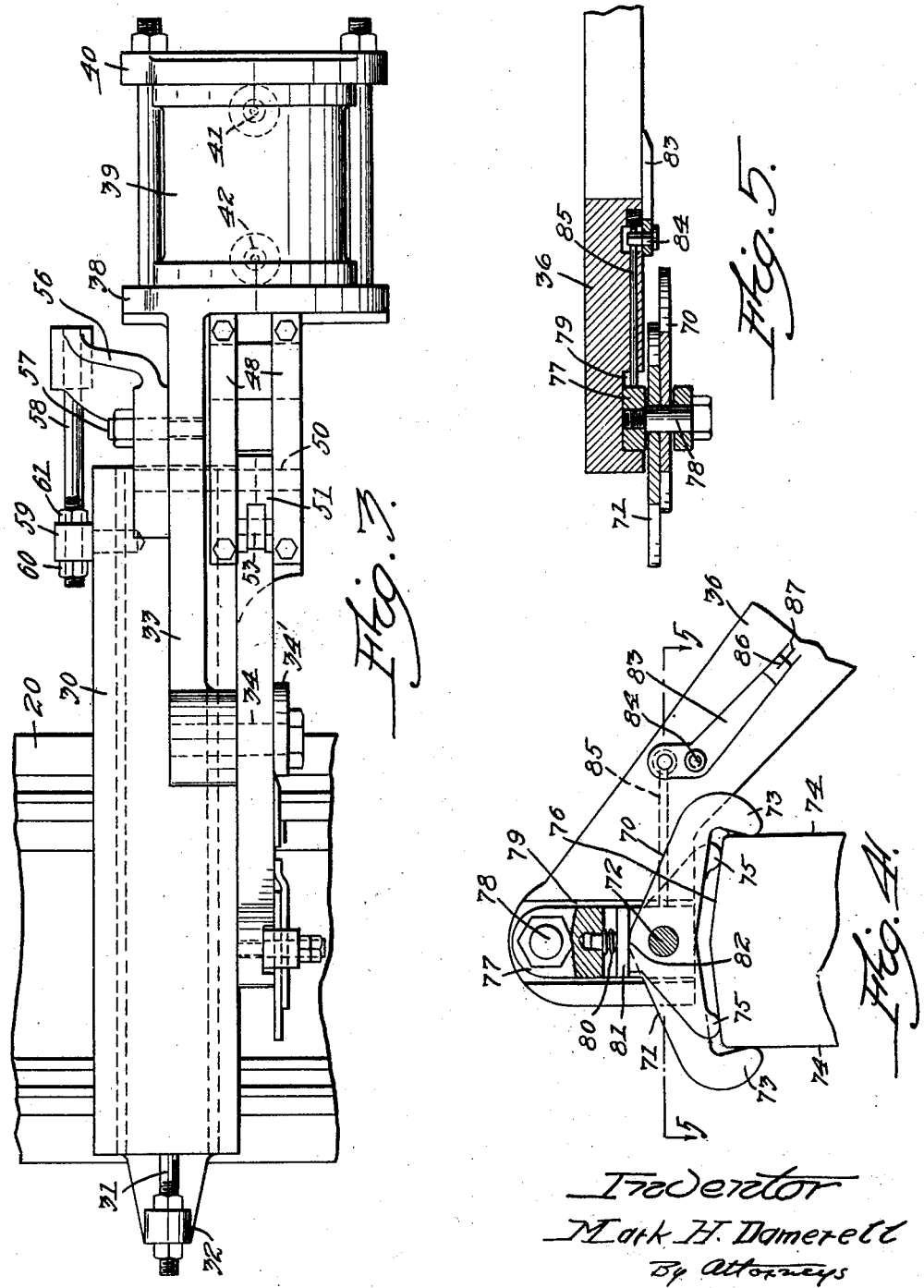

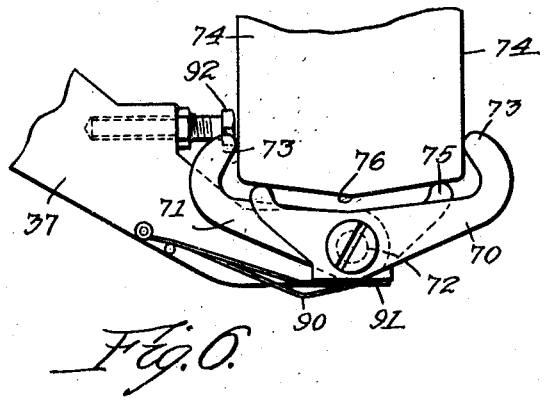
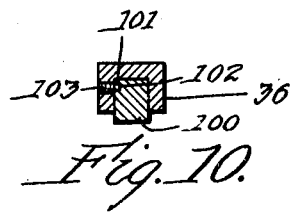
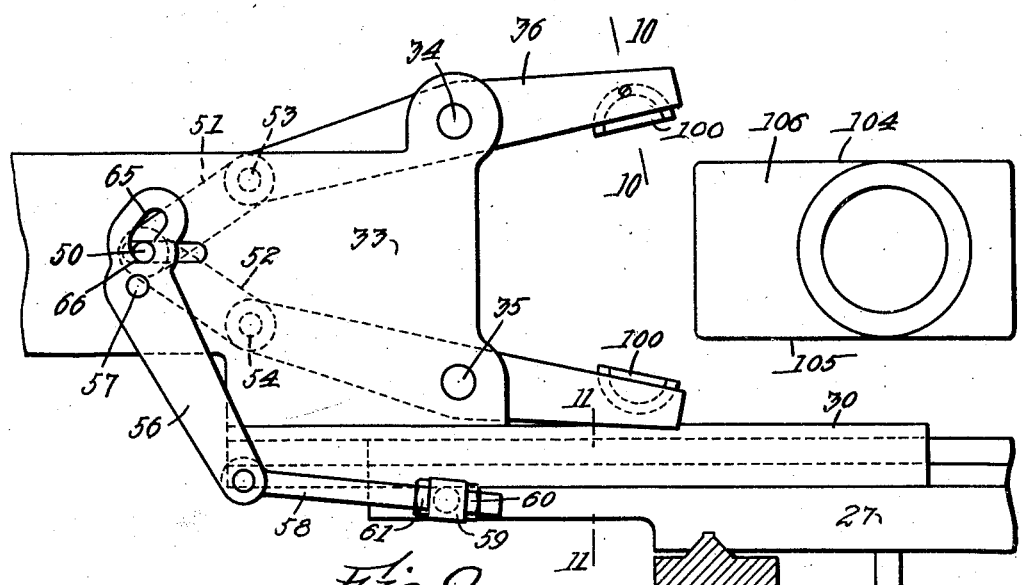

June 24, 1930.   M. H. DAMERELL   1,766,812
CENTERING MACHINE
Filed June 9, 1926   5 Sheets-Sheet 5

Inventor
Mark H. Damerell
By Attorneys

Patented June 24, 1930

1,766,812

UNITED STATES PATENT OFFICE

MARK H. DAMERELL, OF WORCESTER, MASSACHUSETTS, ASSIGNOR TO WYMAN-GORDON COMPANY, OF WORCESTER, MASSACHUSETTS, A CORPORATION OF MASSACHUSETTS

CENTERING MACHINE

Application filed June 9, 1926. Serial No. 114,844.

This invention relates to a machine for centering crank-shafts or similar work prior to drilling the ends of the shaft.

Crank-shafts as now manufactured are forged and bent to the desired shape and are then machined and finished. Before the shaft can be machined or ground the ends thereof must be accurately centered and drilled so that the shafts can be properly supported in position to be machined or ground.

This invention has for its salient object to provide mechanism for quickly and accurately centering crank shafts for drilling.

Another object of the invention is to provide pneumatically controlled and actuated means for accurately centering the crank shaft.

Another object of the invention is to provide a simple and practical method of quickly and accurately centering crank shafts for drilling.

Further objects of the invention will appear from the following specification, taken in connection with the drawings, which form part of this application, and in which Fig. 1 is an elevational view, partly broken away, of a centering and drilling machine having secured thereto means for centering the crank shaft;

Fig. 2 is an enlarged sectional elevation showing one form of centering device constructed in accordance with the invention;

Fig. 3 is a top plan view of the construction shown in Fig. 2;

Fig. 4 is an enlarged elevational view illustrating the construction of the gripping end of one of the centering jaws;

Fig. 5 is a sectional plan view taken substantially on the line 5—5 of Fig. 4;

Fig. 6 is a view similar to Fig. 4, but illustrating a slightly modified form of construction;

Fig. 7 is an elevational view, partly broken away, showing a different form of jaws from those illustrated in Fig. 2;

Fig. 8 is an elevational view taken at right angles to Fig. 7;

Fig. 9 is an elevational view similar to Fig. 2, but illustrating another form of jaws;

Fig. 10 is a detail sectional elevation taken substantially on the line 10—10 on Fig. 9;

Fig. 11 is a sectional view taken substantially on the line 11—11 of Fig. 9;

Figure 12:
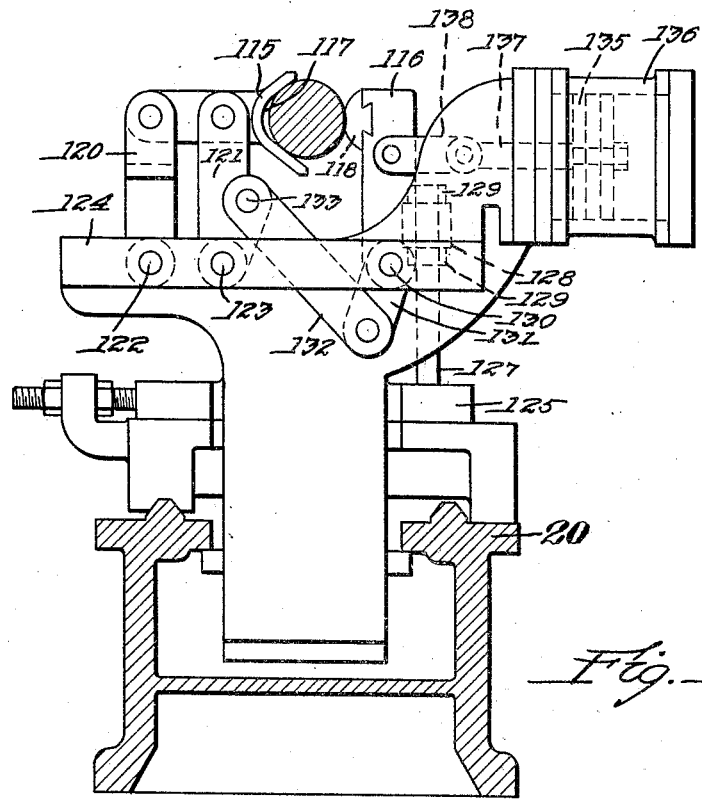
Fig. 12 is an elevational view, partly in section, showing means for centering the shaft horizontally and for holding the shaft in position.
Figure 13:
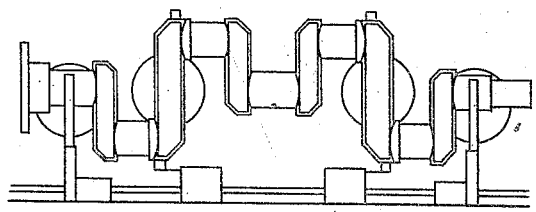
Fig. 13 is a diagrammatic view showing a preferable arangement of centering devices, including two devices for vertical centering and two devices for horizontal centering.

In order to accurately position and center the shaft, the invention preferably utilizes two sets of devices. One set comprises two pairs of jaws which coact with cheeks disposed at the same angle or parallel to each other to center the shaft vertically and hold the shaft against vertical movement while permitting horizontal movement. Another set also comprises two pairs of jaws which coact with the shaft at spaced points thereon to center the shaft horizontally and hold the shaft against horizontal movement while permitting vertical movement. In this way the shaft can be accurately centered and firmly held in position to be drilled.

Each set of the devices for vertically centering the shaft comprises a pair of jaws mounted for bodily movement into operative position and for movement relative to each other subsequent to their bodily movement into position to engage and center the shaft.

In the particular form of the invention shown, the jaw-moving mechanism is operated by pneumatic means, and this means after being started in operation functions automatically to move the jaws to operative position, and then to move the jaws relative to each other into co-acting relation with reference to the shaft to center the shaft. This sequence of operation is reversed as the jaws are withdrawn.

In certain forms of the invention each jaw has mounted on its free end pivoted members which are self-adjusting and are adapted to engage the end and sides of a cheek on the shaft when the jaws are moved inwardly or toward each other. In other forms of the invention lugs or pins are secured to the ends of the jaws and co-act with the cheeks of the crank shaft to center the shaft.

Further details of the invention will appear from the following specification.

In Fig. 1 there is illustrated a machine having a bed-plate 20 and having mounted on the bed-plate drilling devices 21 and 22 for drilling the ends of a crank shaft 23. As shown in Fig. 1 there are mounted intermediate the drilling devices 21 and 22, two sets of vertical centering devices 25 and 26.

Each of the centering devices is supported on a supporting member 27 (Fig. 2) which is longitudinally adjustable relative to the bed-plate 20, and each of the supporting members 27 has slidably mounted thereon a carriage 30 on which the centering device is mounted. An adjustable stop 31 is secured to a lug 32 on the supporting member 27 and limits the movement of the carriage 30 in one direction.

The carriage 30 has secured thereto or formed thereon an upwardly extending bracket or support 33 on which are pivoted at 34 and 35 a pair of levers 36 and 37. A fixed link or plate 34' is secured to and mounted on the pivot pins 34 and 35. The levers 36 and 37 support the jaws for centering the crank shaft and are adapted to swing about their pivots 34 and 35.

The bracket or support 33 has secured to or formed on its rear end a plate 38 which forms one head of a cylinder 39, the other head being shown at 40. The cylinder 39 has a pair of conduits 41 and 42 communicating therewith for conducting compressed air to the cylinder or from the cylinder.

A piston 45 is mounted to reciprocate in the cylinder 39, and has a piston rod 46 extending through the head 38. The free end of the piston is connected to a block 47 slidably mounted in guides 48 and 49. The block carries a pin 50 on which are mounted links 51 and 52 which are pivotally connected at 53 and 54 to the rear ends of the levers 36 and 37. The pin 50 also extends laterally as shown in Fig. 3, the end of the pin being positioned in a slot 55 formed in one end of a lever 56 mounted on a pivot 57 carried by support or bracket 33.

The opposite end of the lever 56 is connected by a link 58 to a stud 59 which is pivotally mounted or swiveled in the member 27. It will be noted from the showing in Fig. 3 that the link 58 is adjustable in length, lock-nuts 60 and 61 being mounted thereon on opposite sides of the stud 59.

The slot 55 in the lever 56, as clearly shown in Fig. 2, has an elongated straight portion 65 and an offset end portion 66. The lever 56 controls the operation of the jaws 36 and 37 in such a manner that the jaws will be moved bodily with the carriage 30 to operative position with respect to the crank shaft until the carriage engages the stop 31 and will then be moved relative to each other and toward each other into position to grip and center the shaft. When the jaws start their movement toward the crank shaft and with the carriage 30, the pin 50 will be disposed in offset end portion 66 of the lever 56 (see Fig. 9). The continued movement of the pin 50 will swing the lever 56 about its pivot 57 until the lever reaches the position shown in Fig. 2, whereupon the further movement of the pin 50 will swing the levers on their pivots 34 and 35 into co-acting relation with respect to the crank shaft.

When the air is admitted to the left-hand end of the cylinder 39, the pin 50 will move to the right, opening the levers, and when the pin reaches the offset end 66 of the lever 56 the carriage will move with the jaws away from the crank shaft.

In the embodiment of the invention shown in Figs. 2 to 5, each of the levers 36 and 37 has pivotally mounted on its free end a pair of self-adjusting centering members 70 and 71, these members being mounted on a common pivot 72. It will be seen that each of the members 70 and 71 has formed on one end a hook-shaped extension 73 adapted to engage one of the sides 74 of a cheek, and each of these members has formed at its opposite end a lateral extension 75 adapted to engage one of the ends 76 of a cheek.

One of the pivot pins 72 is carried by a bar or link 77 which is pivoted at 78 to the lever 36 at the free end thereof. The link or bar 77, as shown in Fig. 5, is loosely mounted for limited pivotal movement in a groove 79, and there is also positioned in this groove a spring 80 which engages a plate 81, which in turn contacts with curved portions 82 formed on the members 70 and 71. The spring operates to swing the members 70 and 71 about their pivot so that the ends 73 will engage the sides of the cheek.

The form of centering jaws above described is used to center shafts like that shown in Fig. 1 having parallel cheeks and in order to indicate whether the cheeks are parallel, an indicator 83 is pivoted at 84 to the lever 36. The indicator has secured thereto a laterally extending pin 85 which is adapted to engage a side edge of the bar 77. When the cheeks are parallel the center line 86 of the indicator 83 will be disposed in alignment with a fixed line 87 on the lever 36.

In the form of the invention shown in Fig. 6, the members 70 and 71 are engaged by springs 90 and 91 of flat strip material. In this form of the invention also, the lever 37 carries an adjustable stop 92 for roughly positioning the crank with reference to the lever 37.

The device shown in Figs. 2 to 5 inclusive operates in the following manner:

When air is admitted to the right hand end of the cylinder 39, the piston 45 and piston rod 46 will be moved to the left, operating first to move the carriage 30 and the levers 36 and 37 to the left until the jaws are positioned above and below the crank shaft, the movement of the carriage 30 to the left being limited by the stop 31. Further movement of the pin 50 will cause the levers 36 and 37 to swing about their pivots 34 and 35, as shown in Fig. 2, and the jaw members 70 and 71 carried by the levers automatically adjust themselves and accurately center the shaft vertically and hold the shaft against vertical displacement as it is being drilled. The vertical centering devices above described do not hold the carriage and shaft against horizontal movement. The stop 31 is commonly set slightly beyond normal central position so that the shaft may be moved back to central position and may be centered horizontally and held against horizontal movement by other suitable mechanism, such as that shown in Fig. 12 and hereinafter described.

In the form of the invention shown in Figs. 7 and 8, the levers 36 and 37 have secured to their free ends laterally extending pins or rollers 95 and 96. It will be noted from the showing in Fig. 8 that the pins 95 on the lever 36 extend in an opposite direction from the pins 96 which are carried by the lever 37. These pins as shown in Fig. 8 co-act with different faces of the crank cheeks.

Figs. 9 and 10 illustrate another form of clamping lever. In this case the levers 36 and 37 are operated as in the other embodiment of the invention, but each of these levers has pivotally mounted at its free end a semi-circular block or jaw 100. Each block has a semi-circular groove 101 in which is positioned a pin 102 carried by a screw 103, threaded into the lever. The blocks 100 are adapted to engage opposite sides 104 and 105 of a cheek 106 and thus center the crank shaft.

The centering devices hereinbefore described are adapted to center the crankshaft vertically but do not center the shaft horizontally, and as a matter of fact, the crank-shaft is not held against horizontal movement by the centering devices shown in Figs. 1 to 11 inclusive except as excess movement is roughly limited by the stop 31.

It is, of course, necessary to have some means for centering the shaft horizontally, and for holding the shaft in centered position, and one form of such means is illustrated in Fig. 12. This means comprises a pair of centering jaws 115 and 116, the jaw 115 having a V-shaped shaft-engaging portion 117 and the jaw 116 having a curved or convex shaft-engaging portion 118.

The jaw 115 is carried by parallel links 120 and 121 pivoted at 122 and 123 to a frame 124. The frame 124 is slidably mounted for vertical movement in a base 125 which in turn is mounted on the bedplate 20. A post 127 is adjustably mounted in a lug 128 carried by the frame 124, and is secured in adjusted position by lock-nuts 129. The post 127 forms a stop for limiting the downward vertical movement of the frame 124 to limit excess vertical movement of the frame 124.

The jaw 116 is pivoted at 130 to the frame 124, and has an extension below its pivot, as shown at 131, the lower end of the extension 131 being connected by a link 132 to the link 121, as shown at 133. It should be noted that the connection 133 of the link 132 to the link 121 is disposed above the pivot 123 of the link 121, whereas the connection of the link 132 to the extension 131 is disposed below the pivot 130 of the jaw 116.

The jaws 115 and 116 are actuated pneumatically by means of a piston 135 disposed in a cylinder 136 and connected by a rod 137 and a link 138 to the jaw 116. When the piston moves forwardly or to the left of the cylinder, the jaws will be closed, and when the piston is moved rearwardly or to the right the jaws will be opened.

Attention is called to the fact that the frame 124 is not held against vertical movement, except as limited by the stop 127, and therefore, the horizontal centering of the shaft by the jaws 115 and 116 does not interfere with the vertical centering of the shaft as hereinbefore described.

The centering devices described in the above specification operate as follows:

The crank-shaft is placed in the machine and loosely supported in any desired manner, as by vertically disposed V-shaped brackets. The valves controlling the pneumatic centering devices are then manipulated in a manner to cause the jaw levers 36 and 37 to move to operative position above and below the crank shaft, and the jaws then to move toward each other so that the self-adjusting centering members 70 and 71 will operate to center the shaft vertically. It will be noted from the showing in Fig. 1, that there are two sets of these centering devices, and one of these sets has an indicator 83 thereon. If the cheeks engaged by the two sets of centering devices are not parallel, the indicator 83 will not register with the mark 87 on the lever 36.

In addition to centering the shaft vertically, the shaft will also be centered horizontally by a centering device, such for instance as that shown in Fig. 12. In this horizontal centering device, as above explained, when air pressure is admitted behind the piston, the jaws 115 and 116 will be moved to operative position, centering the shaft horizontally. After the shaft has been centered vertically and horizontally in the manner just described, the centering drills will be operated to drill the center holes in the ends of the shaft, and thereafter, the centering devices will be released by releasing the air pressure in the cylinders so that the crank shaft may be removed from the machine.

Although in the preceding paragraph describing the operation of the machine, the description explained the operation in connection with the centering jaws shown in Fig. 2, it will be understood that the jaws shown in Figs. 7 or 9 may be used to center the shaft vertically and in conjunction with the horizontal centering accomplished by the device shown in Fig. 12.

Although certain embodiments of the invention have been particularly shown and described, it will be understood that the invention is capable of further modification, and that further changes in the construction and in the arrangement of the various cooperating parts may be made without departing from the spirit or scope of the invention as expressed in the following claims:—

1. A machine for centering crankshafts comprising a frame, a center marking device mounted thereon and having a center axis along which said device is longitudinally movable to mark the work, a pair of supporting members mounted on said frame, means to move said members simultaneously in a given direction of movement transversely of said axis and to operative position relative to said crankshaft and also to move said members toward and away from each other in a direction transverse to the direction of simultaneous movement, and means on said members effective to engage and center a crankshaft in substantial alignment with the axis of movement of said center marking device.

2. The combination in a crankshaft centering machine as set forth in claim 1, in which said latter means is movably mounted relative to said supporting members.

3. The combination in a crankshaft centering machine as set forth in claim 1, in which said latter means is pivotally mounted and self-adjusting relative to said supporting members.

4. The combination in a crankshaft centering machine as set forth in claim 1, in which said latter means engages the ends and side faces of the crankshaft cheeks to center the shaft.

5. A machine for centering crankshafts comprising a frame, a center marking device mounted thereon and having a center axis along which said device is longitudinally movable to mark the work, a pair of supporting members mounted on said frame, and means to move said members transversely of said axis and simultaneously to positions on opposite sides of the crankshaft and thereafter to move said members toward each other to engage said crankshaft and to center said crankshaft in substantial alignment with the axis of movement of said center marking device.

6. A machine for centering crankshafts comprising a frame, a center marking device mounted thereon and having a center axis along which said device is longitudinally movable to mark the work, a support, a pair of centering members carried thereby, and means for moving said support and said members as a unit transversely of said axis and to operative position and for subsequently moving said members relative to each other on said support to engage and center the crankshaft in substantial alignment with the axis of movement of said center marking device.

7. The combination in a crankshaft centering machine as set forth in claim 6, in which the first movement is in a given direction and the second movement is in a direction transverse to the first direction of movement.

8. The combination in a crankshaft centering machine as set forth in claim 6, in which said centering members are provided with self-adjusting crankshaft-engaging devices.

9. The combination in a crankshaft centering machine as set forth in claim 6, in which said centering members are provided with self-adjusting devices by which the ends and side faces of the crankshaft cheeks are engaged.

10. A machine for centering crankshafts comprising a frame, a center marking device mounted thereon and having a center axis along which said device is longitudinally movable to mark the work, a pair of centering members, means for moving said members bodily to operative position in relation to the crankshaft, means for moving said members toward each other to engage the cranks and center the shaft vertically in substantial alignment with said marking device axis, a second pair of centering members spaced longitudinally of the shaft from said first pair, means for moving said second members to operative position, and means for moving said second members toward each other to engage and center the shaft horizontally in substantial alignment with said marking device axis.

11. A machine for centering crankshafts comprising a frame, a center marking device mounted thereon and having a center axis along which said device is longitudinally movable to mark the work, a pair of centering members, means for positioning said members above and below the shaft, means for thereafter engaging the cranks by said members and centering the shaft vertically in substantial alignment with said marking device axis, a second pair of centering members spaced longitudinally of the shaft from said first pair, means for positioning said second members at the two sides of said shaft, and means for moving said second members into engagement with the cranks of the shaft to center the shaft horizontally in substantial alignment with said marking device axis and to hold the shaft against horizontal movement.

12. A machine for centering crankshafts comprising a frame, a center marking device mounted thereon and having a center axis along which said device is longitudinally movable to mark the work, crank engaging means for centering the shaft vertically in substantial alignment with said marking device axis and for holding the shaft against vertical movement but in a manner to permit horizontal movement, and additional crank engaging means for centering the shaft horizontally in substantial alignment with said marking device axis and for holding the shaft against horizontal movement but in a manner to permit vertical movement.

13. The combination in a crankshaft centering machine as set forth in claim 12, in which the crank-engaging means is pneumatically operated.

14. A machine for centering crankshafts comprising a frame, a center marking device mounted thereon and having a center axis along which said device is longitudinally movable to mark the work, two pairs of centering members supported on said frame, means to move said members to operative position, means carried by each pair of members engaging a crankshaft cheek for centering said shaft in substantial alignment with the marking device axis, and means cooperating with said last means to indicate whether said cheeks are parallel.

15. The combination in a crankshaft centering machine as set forth in claim 14, in which said indicating means is mounted on one of said centering members.

16. A machine for centering crankshafts comprising a frame, a center marking device mounted thereon and having a center axis along which said device is longitudinally movable to mark the work, a pair of centering members movable transversely of said axis and simultaneously in one direction and also movable toward and away from each other in another direction, toggle mechanism for moving said members toward and away from each other, and means on said members for engaging and centering a crankshaft in substantial alignment with said marking device axis.

17. The combination in a crankshaft centering machine as set forth in claim 16, in which means is provided for locking said toggle mechanism to permit actuation of said members simultaneously in said first mentioned direction.

18. A machine for centering crankshafts comprising a frame, a center marking device mounted thereon and having a center axis along which said device is longitudinally movable to mark the work, a pair of centering members movable transversely of said axis and simultaneously in one direction and also movable toward and away from each other in another direction, means to lock said members against movement toward each other during simultaneous movement thereof in said first mentioned direction, and means on said members for engaging and centering a crankshaft in substantial alignment with said marking device axis.

19. The combination in a crankshaft centering machine as set forth in claim 18, in which said members are provided with means engaging the ends and side faces of the crankshaft cheeks.

20. A machine for centering crankshafts comprising a frame, a center marking device mounted thereon and having a center axis along which said device is longitudinally movable to mark the work, means to engage the shaft at two axially separated points to position the shaft vertically, said shaft being supported by said means to permit horizontal movement, and means spaced axially of the shaft from said first means and effective to engage the shaft at two other axially separated points to position the shaft horizontally, said shaft being supported by said latter means to permit vertical movement and said shaft being centered by the co-action of said first and second means in substantial alignment with the marking device axis.

21. A machine for centering crankshafts comprising a frame, a center marking device mounted thereon and having a center axis along which said device is longitudinally movable to mark the work, means to engage two axially separated crank cheeks to position the shaft vertically at said cheeks, said shaft being supported by said means to permit horizontal movement, and means spaced axially of the shaft from said first means and effective to engage the shaft at two other axially separated points to position said shaft horizontally, said shaft being supported by said latter means to permit vertical movement, and said shaft being centered by the co-action of said first and second means in substantial alignment with the marking device axis.

22. A machine for centering crankshafts comprising a frame, a center marking device mounted thereon and having a center axis along which said device is longitudinally movable to mark the work, means to engage the shaft by two axially separated crank cheeks to center the shaft thereby in one direction transversely of its axis, said means permitting free movement of the shaft in a second transverse direction, and means spaced axially of the shaft from said first means and effective to simultaneously engage said shaft at two other axially separated points to center the shaft in said second transverse direction, said latter means permitting free movement of the shaft in said first direction, and said shaft being centered by co-action of said first and second means in substantial alignment with the marking device axis.

In testimony whereof I have hereunto affixed my signature.

MARK H. DAMERELL.